US012783737B2

(12) United States Patent
Perez Chamorro et al.

(10) Patent No.: US 12,783,737 B2
(45) Date of Patent: Nov. 3, 2026

(54) STORAGE DEVICE AND OPERATING METHOD

(71) Applicant: NXP B.V., Eindhoven (NL)

(72) Inventors: Jorge Ernesto Perez Chamorro, Préverenges (AT); Vasudev Srinivasan, Mysuru (IN); Hugues Jean Marie de Perthuis, Garcelles (FR)

(73) Assignee: NXP B.V., Eindhoven (NL)

( * ) Notice: Subject to any disclaimer, the term of this patent is extended or adjusted under 35 U.S.C. 154(b) by 113 days.

(21) Appl. No.: 18/754,560

(22) Filed: Jul. 16, 2024

(65) Prior Publication Data

US 2025/0005202 A1 Jan. 2, 2025

(30) Foreign Application Priority Data

Jun. 30, 2023 (IN) ............................. 202341043853

(51) Int. Cl.
*G06F 21/64* (2013.01)

(52) U.S. Cl.
CPC .................................... *G06F 21/64* (2013.01)

(58) Field of Classification Search
CPC .... G06F 21/64; G06F 11/1004; G06F 11/004; G06F 21/54
See application file for complete search history.

(56) References Cited

U.S. PATENT DOCUMENTS 6,092,229 A * 7/2000 Boyle ................. G06F 11/1004 714/748
6,636,971 B1 * 10/2003 Loukianov .............. G06F 21/79 726/16
9,177,153 B1 * 11/2015 Perrig ...................... G06F 21/57
11,886,581 B1 * 1/2024 Jakobsson ............. H04L 63/145
2001/0038085 A1 11/2001 Lesko et al.
2006/0253708 A1 * 11/2006 Bardouillet ............. G06F 21/79 713/176
2008/0147908 A1 6/2008 Lahti et al.
2013/0159791 A1 * 6/2013 Marinet ................ G06F 21/554 714/48
2013/0160121 A1 * 6/2013 Yazdani .................. G06F 21/54 726/23
2016/0028728 A1 * 1/2016 Hampel ................ H04L 9/3234 713/181
2016/0378522 A1 * 12/2016 Kaplan ............... G06F 12/1036 718/1
2018/0048424 A1 2/2018 Meilinger et al.
2018/0121117 A1 * 5/2018 Berger .................. G06F 3/0673
2018/0315349 A1 11/2018 Bostick et al.
2019/0354726 A1 * 11/2019 Critelli ................ G06F 11/1004
2021/0240382 A1 * 8/2021 Li ......................... G06F 3/0673
(Continued)

FOREIGN PATENT DOCUMENTS

CN 113014389 A 6/2021
WO WOD-2008031731 A1 3/2008

*Primary Examiner* — Lynn D Feild
*Assistant Examiner* — Ethan V Vo

(57) ABSTRACT

A storage device and method of operating such a device includes one or more special function registers and a preloading stage having one or more registers. The preloading stage is configured to preload data into a preload register before loading the preloaded data into a special function register. The preloading stage is configured to verify the integrity of the preloaded data before loading the preloaded data into a special function register.

15 Claims, 4 Drawing Sheets

(56) References Cited

U.S. PATENT DOCUMENTS

| | | | | |
|---|---|---|---|---|
| 2021/0406207 | A1* | 12/2021 | Narala | G06F 13/1689 |
| 2023/0021594 | A1* | 1/2023 | Jauss | G06F 12/1441 |
| 2023/0169216 | A1 | 6/2023 | Zheng et al. | |
| 2023/0179227 | A1* | 6/2023 | Otsuka | H03M 13/096<br>714/746 |

* cited by examiner

STORAGE DEVICE AND OPERATING METHOD

CROSS-REFERENCE TO RELATED APPLICATIONS

This application claims priority under 35 U.S.C. § 119 to India patent application No. 202341043853, filed Jun. 30, 2023, the contents of which are incorporated by reference herein.

TECHNICAL FIELD

The present disclosure relates to a storage device. Furthermore, the present disclosure relates to a corresponding method of operating a storage device.

BACKGROUND

A storage device may contain one or more special function registers for temporarily storing control data or configuration data. Such a storage device may for example be integrated into an interface unit, which is interposed between a bus and a peripheral device. In that case, the control data or configuration data may be provided to the peripheral device through the special function registers. However, these special function registers may be vulnerable to fault injection attacks.

SUMMARY

In accordance with a first aspect of the present disclosure, a storage device is provided, comprising: one or more special function registers; a preloading stage comprising a first preload register, wherein the preloading stage is configured to preload data in the first preload register before loading the preloaded data into the special function registers; wherein the preloading stage is further configured to perform a verification of the integrity of the preloaded data before loading said preloaded data into the special function registers.

In one or more embodiments, the preloading stage further comprises a second preload register, and the preloading stage is configured to perform the verification by calculating a checksum on the preloaded data and comparing said checksum with a reference checksum stored in the second preload register.

In one or more embodiments, the preloading stage further comprises a third preload register, and the preloading stage is configured to perform the verification by calculating a combined checksum on the preloaded data and on an address preloaded in the third preload register, and comparing the combined checksum with the reference checksum stored in the second preload register.

In one or more embodiments, the address is an address of a specific one of the special function registers, and the preloading stage is configured to load the preloaded data into said specific one of the special function registers if the combined checksum matches the reference checksum.

In one or more embodiments, the preloading stage is further configured to discard the preloaded data if the address stored in the third preload register does not match any of the addresses of the special function registers.

In one or more embodiments, the preloading stage is configured to discard the preloaded data by loading the preloaded data into a null register or by flushing the preload registers.

In one or more embodiments, the reference checksum is a pre-calculated checksum.

In one or more embodiments, the pre-calculated checksum is based on an error detection code, in particular a cyclic redundancy check, or on an XOR-based longitudinal parity check.

In one or more embodiments, the reference checksum has been pre-calculated by software or firmware.

In one or more embodiments, the preloading stage is further configured to generate an error message upon or after an unsuccessful verification of the integrity of the preloaded data.

In one or more embodiments, the storage device further comprises a default secure destination, wherein said default secure destination is an unassigned address.

In one or more embodiments, an interface unit comprises a storage device of the kind set forth.

In accordance with a second aspect of the present disclosure, a method of operating a storage device is conceived, wherein: a preloading stage comprised in the storage device preloads data in a first preload register before loading the preloaded data into one or more special function registers comprised in the storage device; the preloading stage performs a verification of the integrity of the preloaded data before loading said preloaded data into the special function registers.

In one or more embodiments, the method further comprises storing a reference checksum in a second preload register comprised in the preloading stage, wherein the preloading stage performs the verification by calculating a checksum on the preloaded data and comparing said checksum with the reference checksum stored in the second preload register.

In one or more embodiments, the method further comprises storing an address of said data in a third preload register comprised in the preloading stage, and the preloading stage performs the verification by calculating a first checksum on the preloaded data, calculating a second checksum on the address stored in the third preload register, combining the first checksum and the second checksum, and comparing the combined checksum with the reference checksum stored in the second preload register.

DESCRIPTION OF DRAWINGS

Embodiments will be described in more detail with reference to the appended drawings.

DESCRIPTION OF EMBODIMENTS

As mentioned above, a storage device may contain one or more special function registers for temporarily storing control data or configuration data. Such a storage device may for example be integrated into an interface unit, which is interposed between a bus and a peripheral device. In that case, the control data or configuration data may be provided to the peripheral device through the special function registers. However, these special function registers may be vulnerable to fault injection attacks. Unlike secure elements, which may be able to counter the fault injection attacks by applying an end-to-end integrity concept, most peripherals do not have enough resources for applying such a concept. In other words, for most peripherals applying an end-to-end integrity concept is too power consuming and costly in area. However, protection against fault injection attacks may be desirable for a very reduced set of highly sensitive security configurations. For those cases, the options are very limited since traditionally security has been applied in an all-or-nothing approach.

Now discussed are a storage device and a corresponding method of operating a storage device, which facilitate countering fault injection attacks. The storage device and corresponding operating method may be used to advantage in an interface unit of the kind set forth above.

Figure 1:
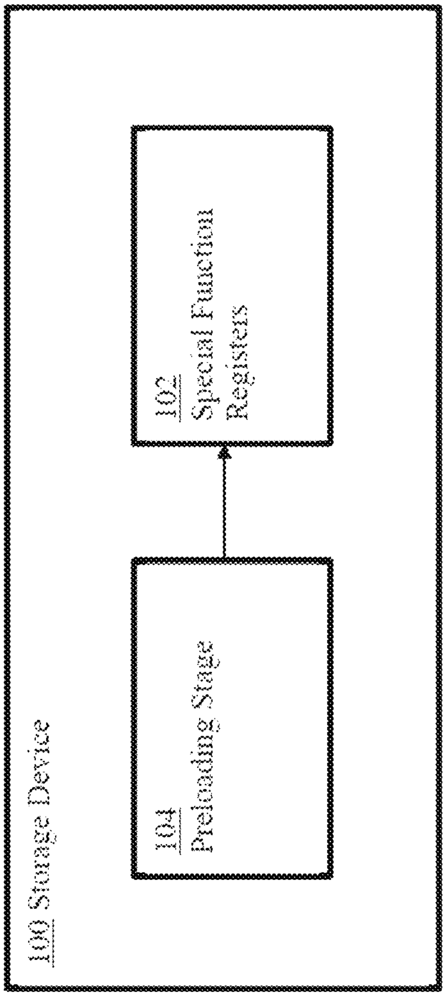
FIG. 1 shows an illustrative embodiment of a storage device.

FIG. 1 shows an illustrative embodiment of a storage device 100. The storage device 100 comprises one or more special function registers 102. Furthermore, the storage device 100 comprises a preloading stage 104 which is operatively coupled to the special function registers 102. The preloading stage 104 comprises a first preload register (not shown). Furthermore, the preloading stage 104 is configured to preload data in the first preload register before loading the preloaded data into the special function registers 102. In addition, the preloading stage 104 is configured to perform a verification of the integrity of the preloaded data before loading said preloaded data into the special function registers 102. By verifying the integrity of the data before they are loaded into the special function registers 102, the vulnerability against fault injections may be reduced. More specifically, although the integrity of the special function registers 102 may also be protected, they might still contain faulty for a few clock cycles. By preloading the data and verifying their integrity before they are loaded into the special function registers 102, this risk may be reduced. It is noted that verifying the integrity of data refers to verifying whether said data have not been manipulated by a malicious party. The skilled person will appreciate that such a verification may be implemented in different ways.

In one or more embodiments, the preloading stage further comprises a second preload register, and the preloading stage is configured to perform the verification by calculating a checksum on the preloaded data and comparing said checksum with a reference checksum stored in the second preload register. In this way, the verification of the integrity of the preloaded data is facilitated. In one or more embodiments, the preloading stage further comprises a third preload register, and the preloading stage is configured to perform the verification by calculating a combined checksum on the preloaded data and on an address preloaded in the third preload register, and comparing the combined checksum with the reference checksum stored in the second preload register. By verifying both the data and the address of the special function register into which the data will be loaded, the resilience against fault injection attacks may be further increased.

In one or more embodiments, the address is an address of a specific one of the special function registers, and the preloading stage is configured to load the preloaded data into said specific one of the special function registers if the combined checksum matches the reference checksum. This results in a practical implementation of verifying the integrity of the data and the address of the special function register into which said data should be loaded. In one or more embodiments, the preloading stage is further configured to discard the preloaded data if the address stored in the third preload register does not match any of the addresses of the special function registers. In this way, the resilience against fault injection attacks may be further increased. In a practical implementation, the preloading stage may be configured to discard the preloaded data by loading the preloaded data into a null register or by flushing the preload registers.

In one or more embodiments, the reference checksum is a pre-calculated checksum. In this way, the reference checksum may easily be generated. Furthermore, in one or more embodiments, the pre-calculated checksum is based on an error detection code (EDC) or an XOR-based longitudinal parity check. More specifically, the EDC may be a cyclic redundancy check (CRC). These are types of checksums which are particularly suitable for verifying the integrity of the preloaded data. However, the skilled person will appreciate that these types merely represent examples, and that other types of checksums may also be used. Furthermore, in a practical implementation, the reference checksum has been pre-calculated by software or firmware. In one or more embodiments, the preloading stage is further configured to generate an error message upon or after an unsuccessful verification of the integrity of the preloaded data. In this way, the system may be triggered to react to a likely fault injection attack in an appropriate manner.

Figure 2:
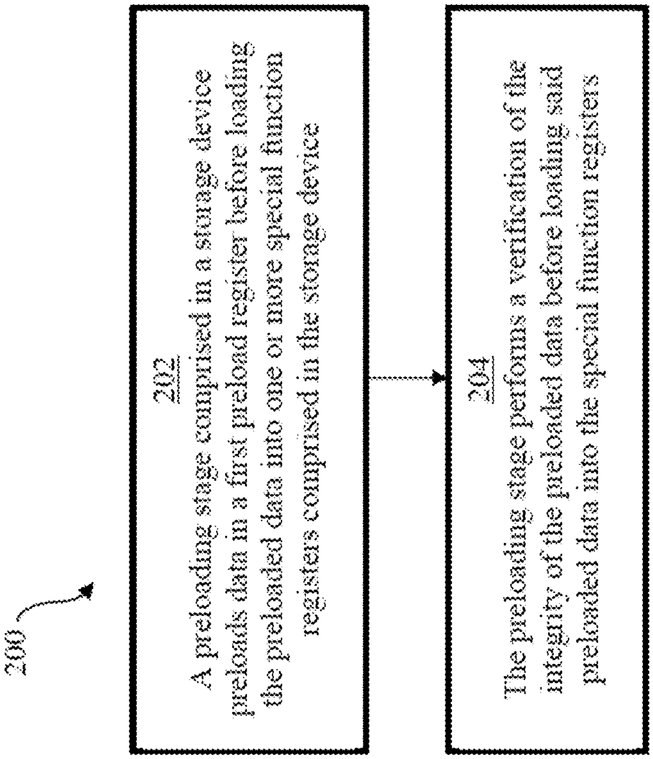
FIG. 2 shows an illustrative embodiment of a method of operating a storage device.

FIG. 2 shows an illustrative embodiment of a method 200 of operating a storage device. The method 200 comprises the following steps. At 202, a preloading stage comprised in the storage device preloads data in a first preload register before loading the preloaded data into one or more special function registers comprised in the storage device. Furthermore, at 204, the preloading stage performs a verification of the integrity of the preloaded data before loading said preloaded data into the special function registers. As mentioned above, by verifying the integrity of the data before they are loaded into the special function registers, the vulnerability against fault injections may be reduced.

The presently disclosed storage device and corresponding operating method facilitate implementing a virtual end-to-end integrity concept, using a mix of software and hardware. By means of multiple accesses to a set of registers indicating destination (e.g., address), contents, and integrity information, the presently disclosed mechanism may ensure that multiple accesses must be successfully attacked for an attacker to inject any fault into the protected special function registers. Otherwise stated, the attacker should not just apply the right timing for the attack once, but also multiple times to different information types (address, contents, integrity) and with timings subject to software modification, with different characteristics each time. This increases exponentially the difficulty of the attack at a negligible software cost and as a consequence significantly reduces the likelihood of the attacker's success.

The virtual end-to-end integrity concept may offer a secure and reliable mechanism to bring the integrity protection benefit of highly secure products to a selected subset of special function registers at a negligible cost, compared to the traditional end-to-end integrity concept. Moreover, it increases exponentially the difficulty for the attacker and therefore diminishes exponentially their rate of success. In addition, since the integrity verification is performed before the data is loaded into the special function registers, it removes the vulnerability that for a few clock cycles a destination register (i.e., a special function register) may contain faulty data before the system starts responding.

More specifically, the virtual end-to-end integrity concept may be based on a system that comprises a control, a set of pre-loading stage registers containing the data and its destination, and an integrity protection (e.g., based on error detecting codes) covering the data and optionally its destination (i.e., the address of the data). Once all the pre-loading registers have been loaded and their integrity has been confirmed, the control may ensure the transfer of the pre-loaded data to integrity-protected special function registers. It is noted that, in addition to the integrity verification performed on the preloaded data, a further integrity verification may be performed on the data loaded into the special function registers. Furthermore, it is noted that the default secure destination may be an unassigned address (i.e., null, for example 0xFFFF_FFFF). The control may be fully hardware automated, in that the hardware may trigger the loading of the data into the special function registers once the data has been preloaded and their integrity has been confirmed. Alternatively, the control may be implemented by a software access to a dedicated preload register CTRL. Furthermore, once the preload registers have been copied to the destination registers, they may be left in a reactive state. Furthermore, the preload registers may be flushed or overwritten, and subsequently the next secure load may be initiated.

Figure 3:
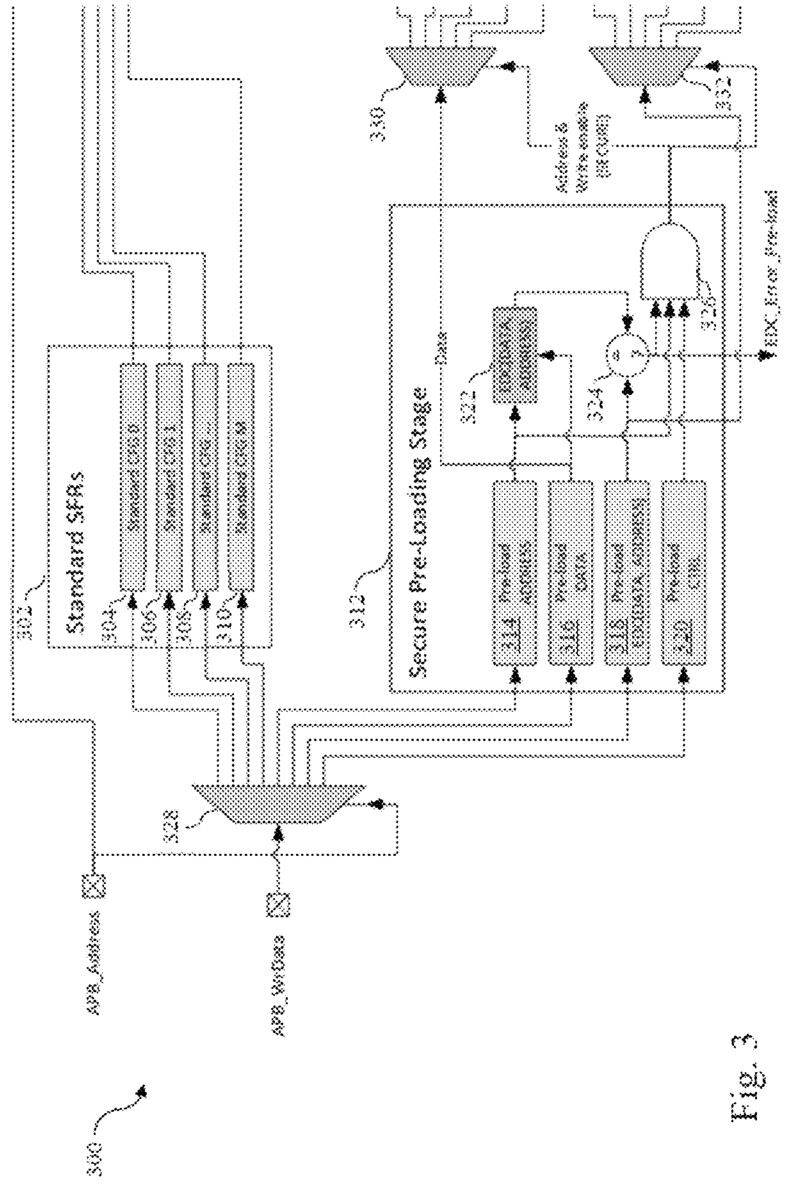
FIG. 3 shows another illustrative embodiment of a storage device.
Figure 3:
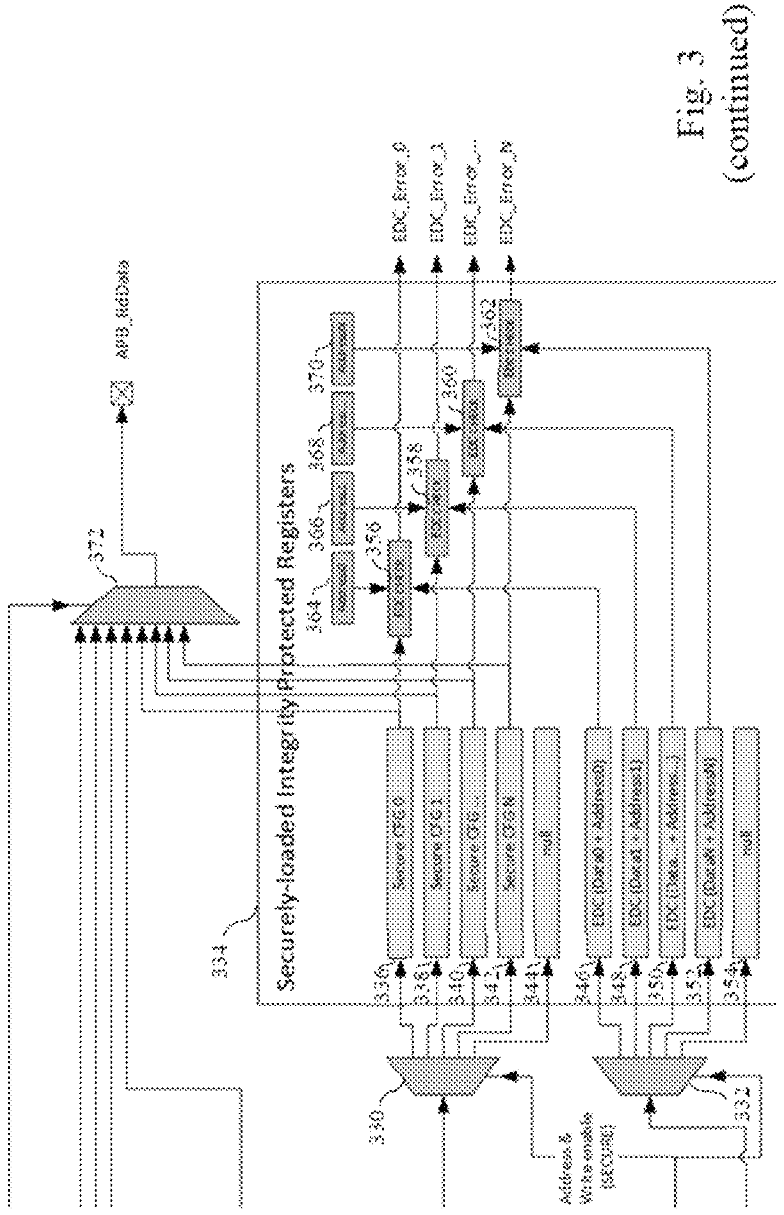

FIG. 3 shows another illustrative embodiment of a storage device 300. The device 300 comprises a set of standard special function registers 302, which are not protected. In addition, the device 300 comprises a set of securely-loaded integrity protected special function registers 334. The latter special function registers 334 are protected by EDC check operations 356, 358, 360, 362 which are performed on the data loaded into the registers 336, 338, 340, 342, addresses 364, 366, 368, 370 and checksum values 356, 358, 360, 362. In accordance with the present disclosure, the storage device 300 contains—in addition to the mechanism based on the EDC check operations 356, 358, 360, 362—a secure preloading stage 312 which performs a verification of the integrity of preloaded data and their addresses. For this purpose, the preloading stage 312 contains preload registers 314, 316, 318, 320 for preloading an address, data, a reference checksum, and a control value, respectively. The reference checksum which is stored in the preloading register 318 is a pre-calculated checksum. To verify the integrity of the preloaded address and data, this reference checksum is compared to a combined checksum 322 calculated from the preloaded address and the preloaded data. If the combined checksum 322 matches the reference checksum, the preloaded data may be loaded into the special function register 336, 338, 340, 342 having the preloaded address. If the combined checksum does not match the reference checksum, an error message may be generated. Furthermore, if the preloaded address does not match any of the addresses of the registers 336, 338, 340, 342, the preloaded data may be discarded, for example by loading them into a null register 344.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another.

Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 storage device
102 preloading stage
104 special function registers
200 method of operating a storage device
202 a preloading stage comprised in a storage device preloads data in a first preload register before loading the preloaded data into one or more special function registers comprised in the storage device
204 the preloading stage performs a verification of the integrity of the preloaded data before loading said preloaded data into the special function registers
300 storage device
302 standard special function registers
304 standard CFG 0
306 standard CFG 1
308 standard CFG . . .
310 standard CFG M
312 secure preloading stage
314 preload ADDRESS
316 preload DATA
318 preload EDC (DATA+ADDRESS)
320 preload CTRL
322 EDC (DATA, ADDRESS)
324 comparator
326 AND gate
328 multiplexer
330 multiplexer
332 multiplexer
334 securely-loaded integrity protected registers
336 secure CFG 0
338 secure CFG 1
340 secure CFG . . .
342 secure CFG N

344 null register
346 EDC (Data0+Address0)
348 EDC (Data1+Address1)
350 EDC (Data . . . +Address . . . )
352 EDC (DataN+AddressN)
354 null register
356 EDC check
358 EDC check
360 EDC check
362 EDC check
364 Address0
366 Address1
368 Address . . .
370 AddressN
372 multiplexer

The invention claimed is:

1. A storage device, comprising:

one or more special function registers; and a preloading stage comprising:

a first preload register, wherein the preloading stage is configured to preload data in the first preload register before loading the preloaded data into the special function registers, wherein the preloading stage is further configured to perform a verification of the integrity of the preloaded data before loading said preloaded data into the special function registers;

a second preload register configured to store a reference checksum; and a third preload register, and wherein the preloading stage is configured to perform the verification by calculating a combined checksum on the preloaded data and on an address preloaded in the third preload register, and comparing the combined checksum with the reference checksum stored in the second preload register.

2. The device of claim 1, wherein the address is an address of a specific one of the special function registers, and wherein the preloading stage is configured to load the preloaded data into said specific one of the special function registers if the combined checksum matches the reference checksum.

3. The device of claim 2, wherein the preloading stage is further configured to discard the preloaded data if the address stored in the third preload register does not match any of the addresses of the special function registers.

4. The device of claim 3, wherein the preloading stage is configured to discard the preloaded data by loading the preloaded data into a null register or by flushing the preload registers.

5. The device of claim 1, wherein the reference checksum is a pre-calculated checksum.

6. The device of claim 5, wherein the pre-calculated checksum is based on a cyclic redundancy check or on an XOR-based longitudinal parity check.

7. The device of claim 5, wherein the reference checksum has been pre-calculated by software or firmware.

8. The device of claim 1, wherein the preloading stage is further configured to generate an error message upon or after an unsuccessful verification of the integrity of the preloaded data.

9. An interface unit comprising a storage device, wherein the storage device comprises:

one or more special function registers;

a preloading stage comprising:

a first preload register, wherein the preloading stage is configured to preload data in the first preload register before loading the preloaded data into the special function registers, wherein the preloading stage is further configured to perform a verification of the integrity of the preloaded data before loading said preloaded data into the special function registers;

a second preload register configured to store a reference checksum; and a third preload register, and wherein the preloading stage is configured to perform the verification by calculating a combined checksum on the preloaded data and on an address preloaded in the third preload register, and comparing the combined checksum with the reference checksum stored in the second preload register.

10. A method of operating a storage device, the method comprising:

preloading, by a preloading stage comprised in the storage device; data in a first preload register before loading the preloaded data into one or more special function registers comprised in the storage device;

performing, by the preloading stage, a verification of the integrity of the preloaded data before loading said preloaded data into the special function registers;

storing a reference checksum in a second preload register comprised in the preloading stage; and storing an address of said data in a third preload register comprised in the preloading stage, wherein the preloading stage performs the verification by calculating a first checksum on the preloaded data, calculating a second checksum on the address stored in the third preload register, combining the first checksum and the second checksum, and comparing the combined checksum with the reference checksum stored in the second preload register.

11. The method of claim 10, wherein the address is an address of a specific one of the special function registers, and wherein the preloading stage loads the preloaded data into said specific one of the special function registers if the combined checksum matches the reference checksum.

12. The method of claim 11, wherein the preloading stage discards the preloaded data if the address stored in the third preload register does not match any of the addresses of the special function registers.

13. The method of claim 12, wherein the preloading stage discards the preloaded data by loading the preloaded data into a null register or by flushing the preload registers.

14. The method of claim 10, wherein the reference checksum is a pre-calculated checksum.

15. The method of claim 14, wherein the pre-calculated checksum is based on a cyclic redundancy check or on an XOR-based longitudinal parity check.

* * * * *